June 23, 1970    A. J. GERARD    3,516,893
DECORATIVE LAMINATED PANEL AND METHOD OF MAKING THE SAME
Filed May 3, 1967
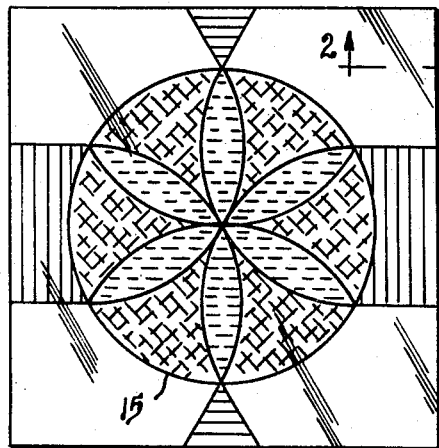
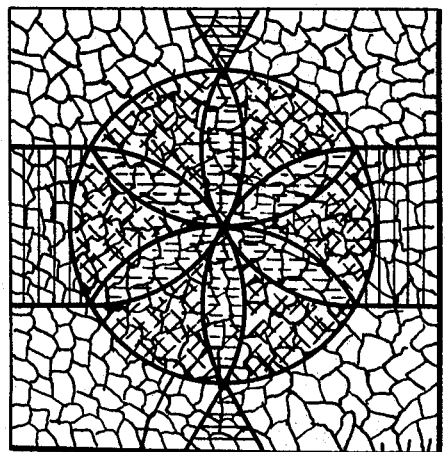
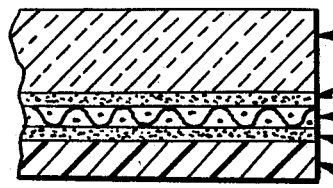
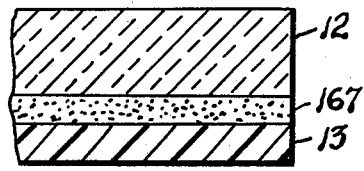
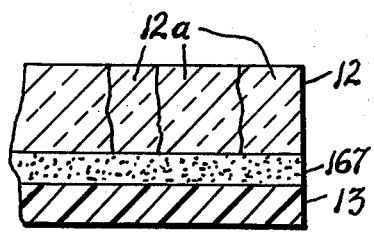
INVENTOR
Anthony J. Gerard
BY Munson H. Lane
ATTORNEY

United States Patent Office 3,516,893
Patented June 23, 1970

3,516,893
DECORATIVE LAMINATED PANEL AND METHOD
OF MAKING THE SAME
Anthony J. Gerard, 409 E. 64th St.,
New York, N.Y. 10021
Filed May 3, 1967, Ser. No. 635,748
Int. Cl. B44f 1/06; B32b 19/06
U.S. Cl. 161—6      7 Claims

ABSTRACT OF THE DISCLOSURE

A decorative laminated panel having a design printed sheet of acetate fabric interposed between and adhesively bonded to a sheet of tempered glass and a backing sheet, the adhesive bonding containing an ingredient which produces at least a partial solvent effect on the acetate fabric while retaining its printed design in application to the glass. The tempered glass may be shattered, either prior to or after its assembly in the panel, to produce a mosaic effect.

---

This invention relates to new and useful improvements in the art of making decorative material, more particularly, decorative transparent or translucent panels which may be used in place of stained glass windows as well as for ornamental displays and other like purposes.

The principal object of the invention is to provide a highly aesthetic decorative panel of laminated construction including at least one transparent lamina such as a layer of glass, having color and design applied thereto in a novel manner from another lamina by an adhesive.

More specifically, the decorative panel of the invention has a sheet of acetate fabric, ornamental with a colored design, interposed between and adhesively bonded to a layer of glass and a suitable backing sheet, the adhesive acting as at least a partial solvent for the acetate fibers so that the colored design thereof is applied or transferred to the glass.

As another feature, the decorative effect of the invention is further enhanced by employing tempered glass which may be shattered or fractured while retaining its panel form, thus lending mosaic characteristics to the decorative panel. Alternatively, such mosaic characteristics may be attained by first shattering the glass into individual pieces or particles and installing such pieces or particles individually in place.

In addition to providing a novel decorative panel itself, the invention also provides a novel method of making such a panel.

The decorative panel of the invention is simple in construction, highly pleasing in appearance, and lends itself to convenient and economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a plan view showing a decorative laminated panel of the invention prior to fracture of the glass;

FIG. 2 is an enlarged cross-sectional detail, taken substantially in the plane of the line 2—2 in FIG. 1 with the thickness of the adhesive and fabric layers exaggerated for sake of clarity;

FIG. 3 is a cross-sectional detail, similar to that in FIG. 2, but with the fabric layer absorbed into the adhesive;

FIG. 4 is a plane view of the panel, similar to that in FIG. 1, but with the glass shattered; and FIG. 5 is an enlarged cross-sectional detail, similar to that in FIG. 3 but with the shattered glass.

In FIGS. 1 and 4 the parallel vertical and horizontal lines and the dotted diagonal lines represent contrasting colors of the decorative design.

Referring now to the accompanying drawings in detail, the general reference numeral 10 in FIG. 1 designates a decorative, laminated panel of the invention prior to shattering or fracturing of its glass lamina, while the numeral 10A in FIG. 4 designates the same panel with fractured glass producing a mosaic effect.

The panel 10, being of laminated construction, comprises an upper or outer lamina 12 of tempered glass; a suitable backing sheet 13 which preferably consists of transparent material commercially known as "Lucite," the same being a methacrylate ester polymer which is a well known commercially available substance; and a sheet of acetate fabric 14, that is, fabric made from cellulose acetate fibers, which is interposed between the glass layer 12 and the backing sheet 13, as will be apparent from FIG. 2.

Although it is preferred for the backing sheet 13 to be transparent, if transparency of the panel is not desired the backing sheet may be made of opaque material, as for example, hard pressed fiberboard commercially known as "Masonite," or the like, and, for that matter, the backing sheet may be made of wood, metal, or any other suitable material, unless transparency of the panel is desired as above noted.

The acetate fabric layer 14 is printed or otherwise provided with a colored design as shown by way of an example at 15, it being understood that any suitable design may be used and that the design appearing in FIGS. 1 and 4 is for illustrative purposes only.

In any event, the acetate fabric sheet 14, interposed between the glass layer 12 and the backing sheet 13, is bonded to the backing sheet by an adhesive layer 16 and is similarly bonded to the glass layer by an adhesive layer 17, as will be apparent from FIG. 2.

The adhesive preferably used is a composition containing an ingredient which exerts a solvent action on the cellulose acetate fibers of the fabric layer 14, but does not affect the color and design. An adhesive possessing such characteristics is commercially known as "Duco" cement, manufactured by E. I. du Pont de Nemours & Co., Inc. The "Duco" cement contains acetone and butyl acetate as ingredients, both of which appear to have at least a partial solvent effect on the acetate fabric 14 without destroying the color and pattern of the design.

When the laminae of the panel 10 have been assembled as described, the solvent effect of the adhesive layers 16, 17 upon the acetate fabric sheet 14 will cause the cellulose acetate fibers of the sheet to become at least partially, if not completely absorbed in the adhesive, and the two adhesive layers will virtually unite into a single layer 167, bonding the glass 12 directly to the backing sheet 13, as illustrated in FIGS. 3 and 5. Moreover, since the solvent effect of the adhesive does not affect the color and pattern of the design originally carried by the fabric 14, such design becomes implanted in the combined adhesive layer 167 and thereby transferred or applied directly to the glass 12, thus in effect resulting in the glass being ornamented by the decorative design.

With this accomplished, the decorative panel 10 may be used as shown in FIG. 1, but in order to enhance the aesthetic effect further, the tempered glass 12 may be shattered or fractured, as by impacting the same in a suitable manner, so that the tempered glass is broken into a multitude of individual, contiguous pieces or particles 12a. As such, the shattered glass still retains its panel form, with the individual particles being bonded to the backing sheet 13 by the adhesive layer 167, as will be apparent from FIG. 5. However, as distinguished from FIG. 1, the shattered glass of the panel 10A in FIG. 4 will present a mosaic effect, thus greatly enhancing the aesthetic appearance of the panel, as already noted.

The mosaic effect may be attained either by shattering the glass 12 after the laminae 12, 13, 14 have been assembled as described, or alternatively, the glass 12 may be shattered first, that is, prior to assembly, in which event the individual glass particles 12a may be individually placed in position.

While in the foregoing there has been described and shown the preferred embodiment of the invention, various modifications may become apparent to those skilled in the art to which the invention relates. Accordingly, it is not desired to limit the invention to this disclosure, and various modifications and equivalent may be resorted to, falling within the spirit and scope of the invention as claimed.

What is claimed as new is:

1. A method of making a decorative laminated panel which comprises adhering a sheet of design printed fabric soluble in an organic solvent to a backing sheet, adhering a sheet of translucent tempered glass to the fabric by means of an adhesive composition containing a solvent for the fabric, fracturing the tempered glass, and permitting the solvent to dissolve the fabric without destroying the printed design.

2. A method according to claim 1 wherein the fabric is cellulose acetate, and the solvent is a member of a group consisting of acetone and butyl acetate and mixtures thereof.

3. A method according to claim 1 wherein the backing sheet is translucent.

4. A method according to claim 1 wherein the backing sheet is of clear plastic material.

5. A method according to claim 1 wherein the backing sheet is a methacrylate ester.

6. A decorative laminated panel comprising a backing sheet, a shattered tempered glass layer, and an intermediate decorative printed design layer incorporated in an adhesive bonding the glass layer to the backing sheet, and produced by the method defined in claim 1.

7. A decorative laminated panel in accordance with claim 6 wherein the backing sheet is of clear plastic material.

References Cited

UNITED STATES PATENTS

| 1,727,937 | 9/1929 | Randall | 161—92 X |
| 2,887,806 | 5/1959 | Hassett | 161—1 |
| 2,949,689 | 8/1960 | Vida | 161—162 X |

JOHN F. GOOLKASIAN, Primary Examiner

R. A. KILLWORTH, Assistant Examiner

U.S. Cl. X.R.

156—277, 305; 161—92, 162, 413